United States Patent
Ferreira et al.

(10) Patent No.: US 6,267,416 B1
(45) Date of Patent: Jul. 31, 2001

(54) CONNECTOR ASSEMBLY FOR AXIAL LOADS

(75) Inventors: Luis Ferreira, Ajax; Goran D'Juric, Mississauga, both of (CA)

(73) Assignee: REA International, Inc. (CA)

( * ) Notice: Subject to any disclaimer, the term of this patent is extended or adjusted under 35 U.S.C. 154(b) by 0 days.

(21) Appl. No.: 08/944,235

(22) Filed: Oct. 6, 1997

(30) Foreign Application Priority Data

Oct. 7, 1996 (GB) .................................................. 9620853

(51) Int. Cl.[7] ...................................................... F16L 21/08
(52) U.S. Cl. ............................................ 285/319; 285/322
(58) Field of Search ...................................... 285/319, 322, 285/323

(56) References Cited

U.S. PATENT DOCUMENTS

| | | | |
|---|---|---|---|
| 2,543,087 | 2/1951 | Woodling | 285/86 |
| 2,543,088 | 2/1951 | Woodling | 285/97.8 |
| 2,545,930 | 3/1951 | Richardson | 285/87 |
| 2,585,887 | * 2/1952 | Woodward | 285/319 |
| 3,210,102 | 10/1965 | Joslin | 285/374 |
| 4,269,438 | 5/1981 | Ridenour | 285/382.2 |
| 4,601,497 | 7/1986 | Bartholomew | 285/319 |
| 4,610,468 | 9/1986 | Wood | 285/81 |
| 4,637,640 | * 1/1987 | Fournier et al. | 285/319 |
| 4,653,781 | 3/1987 | Sheets et al. | 285/319 |
| 4,836,580 | * 6/1989 | Farrell | 285/319 |
| 4,880,260 | 11/1989 | Gotoh et al. | 285/382.2 |
| 4,913,467 | 4/1990 | Washizu | 285/39 |
| 4,925,217 | * 5/1990 | Ketcham | 285/319 |
| 4,948,180 | 8/1990 | Usui . | |
| 5,042,848 | * 8/1991 | Shiozaki | 285/323 |
| 5,141,264 | 8/1992 | Usui | 285/319 |
| 5,161,832 | 11/1992 | McNaughton et al. | 285/319 |
| 5,163,719 | 11/1992 | Washizu | 285/319 |
| 5,195,787 | 3/1993 | Bartholomew | 285/319 |
| 5,284,369 | 2/1994 | Kitamura et al. . | |
| 5,338,071 | 8/1994 | Hohmann et al. | 285/233 |
| 5,462,313 | 10/1995 | Rea et al. | 285/21 |
| 5,492,376 | 2/1996 | Usui et al. | 285/382 |
| 5,538,297 | 7/1996 | McNaughton et al. | 285/319 |
| 5,542,717 | 8/1996 | Rea et al. | 285/319 |
| 5,707,085 | * 1/1998 | Kubiak | 285/319 |
| 5,738,387 | * 4/1998 | Guest | 285/322 |

FOREIGN PATENT DOCUMENTS

| | | | |
|---|---|---|---|
| 3169030 | 2/1965 | (CA) | 285/86 |
| 2220115 | * 1/1973 | (DE) | 285/319 |
| 4139124 | 4/1993 | (DE) . | |
| 2666134 | 2/1992 | (FR) . | |
| 1147980 | 4/1969 | (GB) . | |
| 0331116 | 9/1989 | (GB) . | |
| 2249150 | 4/1992 | (GB) . | |

* cited by examiner

Primary Examiner—Eric K. Nicholson
(74) Attorney, Agent, or Firm—Webb Ziesenheim Logsdon Orkin & Hanson, P.C.

(57) ABSTRACT

A connector assembly comprising a retainer mounted axially to tubing, conduit, rod, cable or other axially loaded components behind a male insert having an annular ring or bead or an expanded end portion. Upon assembly of the male insert and retainer into a female receptor, the retainer arm's spring extensions compress to permit entry into the female receptor and once past an annular protrusion in the receptor, resume their normal state. This prevents the female receptor and the male insert from disengaging by the interference between the annular ring, the annular protrusion and the retainer arms and also prevents debris from entering into the joint connection, thereby affecting the operation of the retainer and any sealing means.

24 Claims, 11 Drawing Sheets

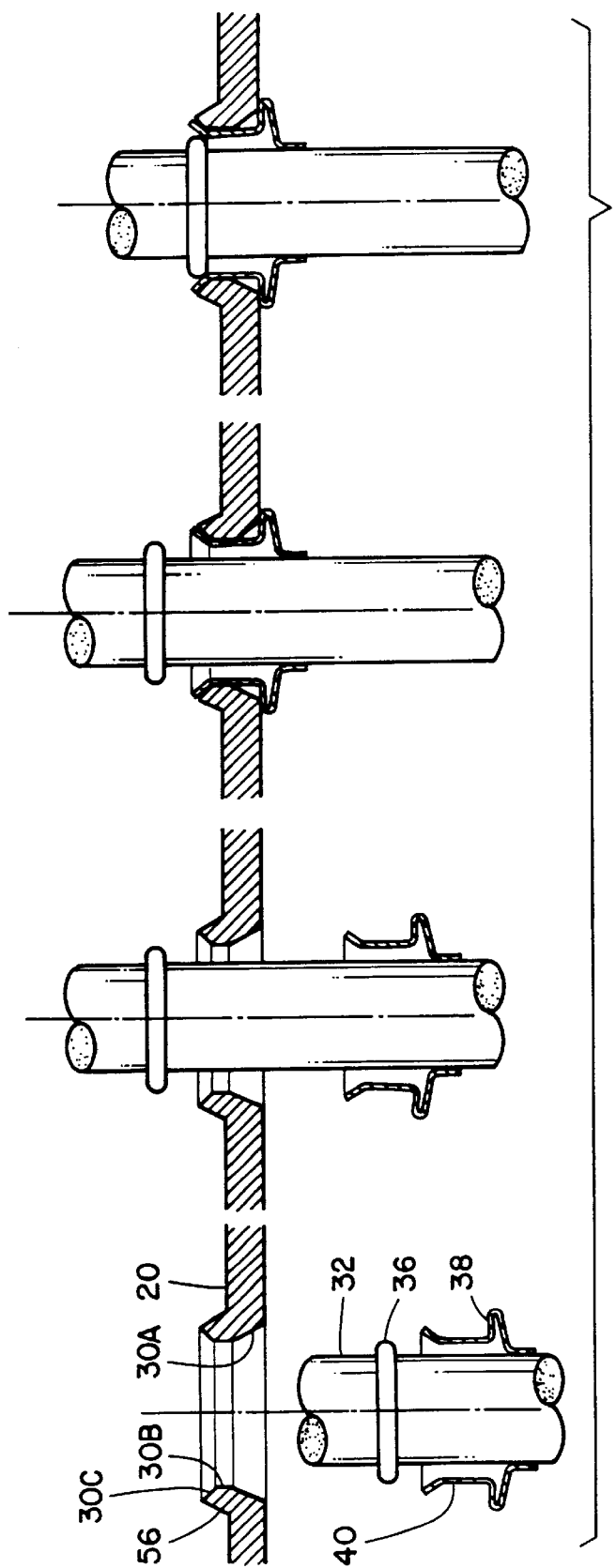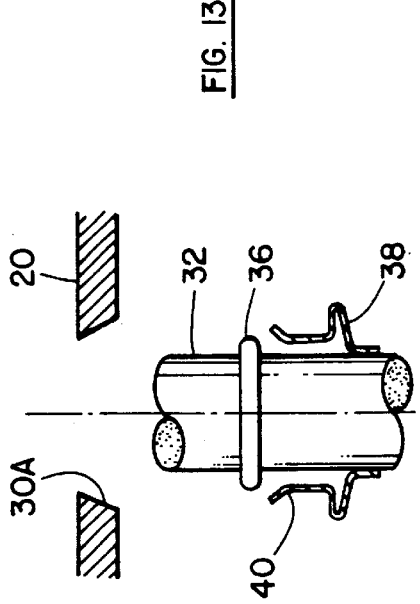
FIG. 13A
FIG. 13B

CONNECTOR ASSEMBLY FOR AXIAL LOADS

FIELD OF THE INVENTION

The present invention relates to a connector assembly that securely connects axially loaded components of various cross sections such as, but not limited to, tubing, conduits, rods or cables.

BACKGROUND OF THE INVENTION

Various types of connectors are presently available. However, many of these connectors are difficult to manufacture, can be used only with tubing or conduits and have complicated male inserts and/or female receptors. Also, some connectors have separate dust caps which increase the complexity and expense associated with the apparatus. Many of the connectors rely on spring wire, sheet metal or plastic retainers that secure tubing by the action of longitudinal compression or shear. The ultimate strength of the connection is therefore dependant upon the resistance of the projections to buckling or the shear strength of the material and the number of projections used. The physical size of the connection, the physical properties of the materials used and the design of the retainer tend to limit the loads that can be applied to the connections. Also, many of the connectors presently available do not allow for the assembler to determine through audible, tactile and visual means that the connection has been securely made.

U.S. Pat. No. 5,195,787 (issued on Mar. 23, 1993) discloses a male conduit with an annular bead, a female housing and a second "female" conduit. The female conduit may include a horse-shoe shaped clip which is inserted into the female housing using a specific tool. U.S. Pat. No. 4,601,497 (issued on Jul. 22, 1986) also discloses various connecting assemblies which involve a male conduit with an annular bead which passes through a clip into a female housing, but this design is limited to inserts of circular cross section. These designs are complicated and expensive to manufacture and do not prevent debris from collecting around the clip and the spacing around the entry of the male conduit into the female conduit. Also, the strength of the clip is dependant on the internal member's resistance to buckling wherein the structural members of the clip are in compression along the clip's longitudinal access.

U.S. Pat. No. 5,538,297 (issued on Jul. 23, 1996) discloses a complicated assembly to join conduits consisting of a male conduit with two annular beads which is surrounded by a sleeve with a clip on the second bead. An optional plug or dust boot may be inserted into the opening of the female housing to prevent contamination. This assembly, however, is very complicated and involves expensive tooling.

There is a need for a simple retainer which has quick connect and disconnect capabilities to connect two components which functions both as a retainer and a functional or aesthetic dust cap. There is also a need for a retainer which utilizes the compressive resistance of the material of the retainer instead of the shear or compression modes available in the prior art. There is also a need for a retainer which allows for the assembler to determine, through audible, tactile and visual stimuli, that the connection has been made.

SUMMARY OF INVENTION

In accordance with an aspect of the present invention, there is provided a connector assembly comprising:
a male insert having an upset,
a female receptor having a cavity for receiving the male insert, the cavity extending axially inwardly from an entrance to an interior portion, the cavity having an inwardly extending protrusion,
a slideable retainer member surrounding the male insert, the retainer member comprising a plurality of elongate, resilient retainer arms, the arms adapted to be compressed between the upset and the protrusion, the arms extending along a longitudinal axis of the male insert
wherein, when assembled, the male insert is retained within the female receptor through interference of the retainer arms between the upset and the protrusion.

In accordance with a further aspect of the invention, there is provided a connector assembly wherein the protrusion is comprised of an interior section, a middle section and an exterior, inwardly sloping section, such that the interior section allows for space for the retainer arms to expand after the retainer arms are deformed around the middle section of the protrusion upon insertion of the retainer into the cavity.

In accordance with a further aspect of the invention, there is provided a retainer member capable of slideable adaptation around a male insert, the retainer member comprising:
a plurality of elongate, resilient retainer arms, the retainer arms capable of extending along a longitudinal axis of the male insert,
the retainer arms adapted to create interference between an upset on the male insert and an annular protrusion in a female receptor to retain the male insert in the female receptor.

In accordance with a further aspect of the invention, a female receptor is provided which is adapted to receive a male insert, the female receptor and the male insert capable of being connected by a retainer, comprising:
a cavity for receiving the male insert, the cavity extending axially inwardly from an entrance to an interior portion, the cavity having an inwardly extending protrusion,
the protrusion comprising an interior section, a middle section and an exterior, inwardly sloping section, the interior section allowing for space for a plurality of retainer arms to expand after the retainer arms are deformed around the middle section of the protrusion upon insertion of the retainer.

Advantages of the present invention include that the connector assembly is economical to manufacture without the need for complicated parts. Also, the retainer functions both to maintain the connection and as a functional aesthetic dust cap.

BRIEF DESCRIPTION OF THE DRAWINGS

These and other aspects of the invention, as well as the details of several illustrative embodiments, will be more fully understood from the following drawings in which like numeral denote like parts in the several views, and in which:

FIGS. 13A and 13B are sectional views of an eighth and ninth embodiment of the invention as an unsealed plate receptor;

Figure 1:
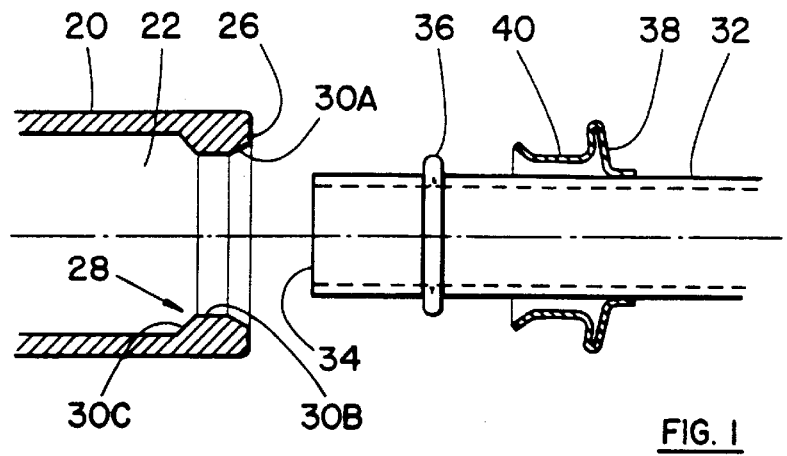
FIG. 1 is a sectional view of a first embodiment of the joint design.
Figure 2:
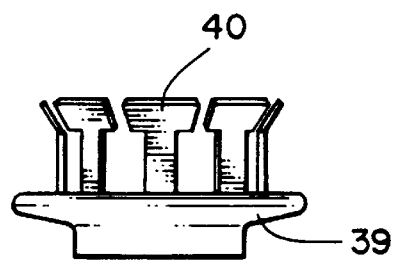
FIG. 2 is a side view of an embodiment of the retainer member.
Figure 3:
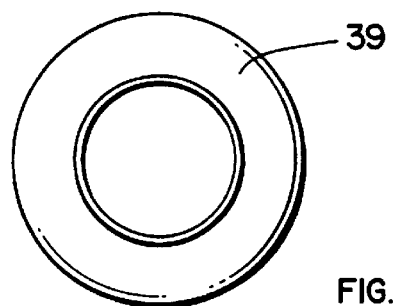
FIG. 3 is a bottom view of an embodiment of the retainer member.
Figure 4A:
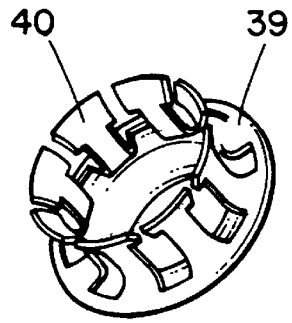
FIGS. 4A to 4C are views of embodiments of the retainer member.

In the drawings, preferred embodiments of the invention are illustrated by way of example. It is to be expressly understood that the description and drawings are only for the purpose of illustration and as an aid to understanding preferred embodiments of the present invention, and are not intended as a definition of the limits of the invention.

DETAILED DESCRIPTION OF THE PREFERRED EMBODIMENT

The embodiments of the invention's connector assembly seen in FIGS. 1–14, broadly considered, includes two connector members: a female receptor (20) and a male insert (32). It will be understood that the female receptor (20) and the male insert (32) are adapted to be suitably secured to, or are themselves part of, any axially loaded component of various cross-section including but not limited to tubing, conduit, rod or cable and that the components can be of various cross-sections including non-circular cross-sections. The male insert (32) and female receptor (20) are operative in response to insertion of the male insert (32) into the female member (20) to connect the male insert (32) to the female receptor (20) to form a continues passage through the connection to establish communication between the components associated with the connector members. It will be understood that the invention is applicable to connections involving the movement of fluids in addition to solids and other non-fluid arrangements.

Figure 8A:
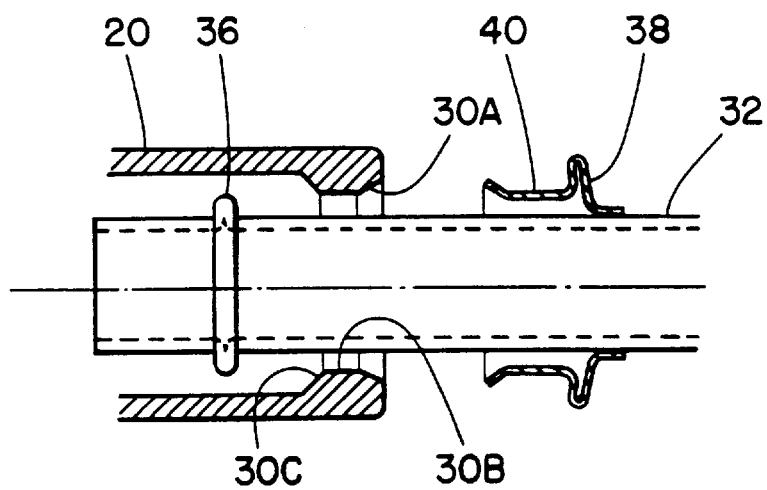
FIGS. 8A to 8E are sectional views illustrating the assembly and disassembly of an embodiment of the invention.
Figure 8B:
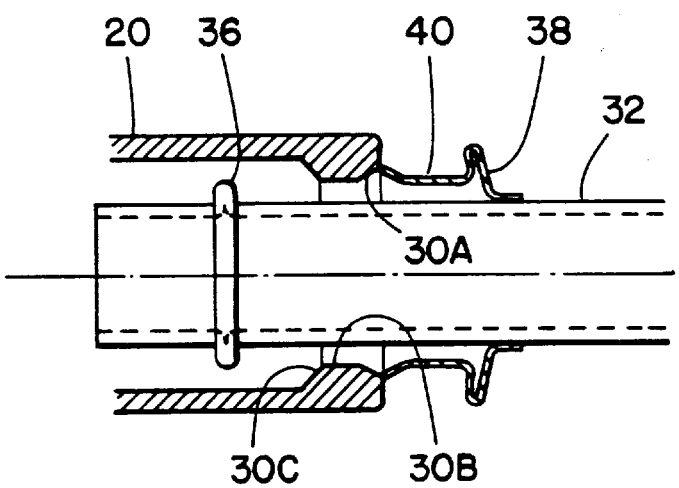
Figure 8C:
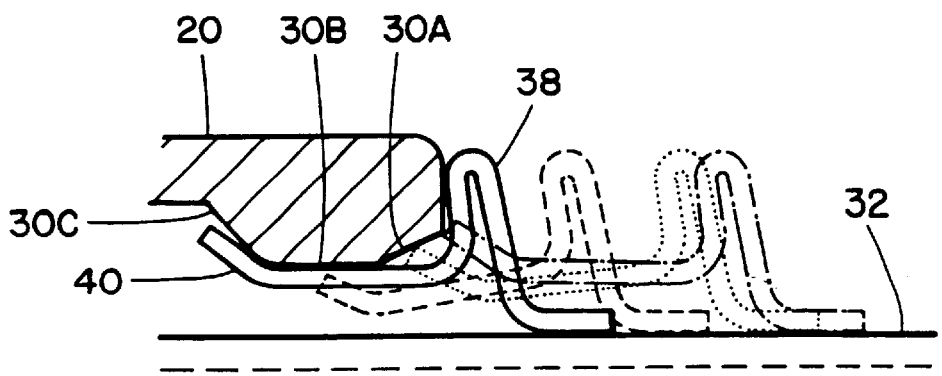
Figure 8D:
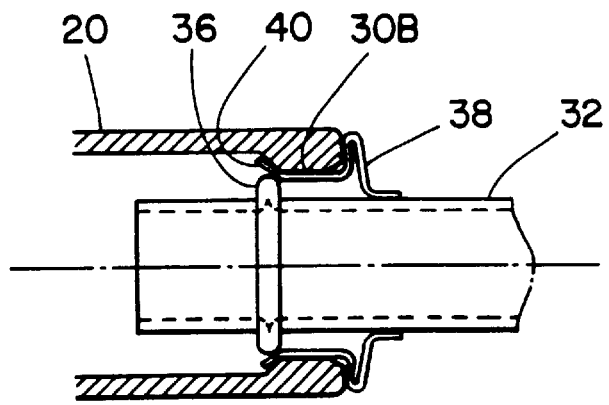
Figure 8E:
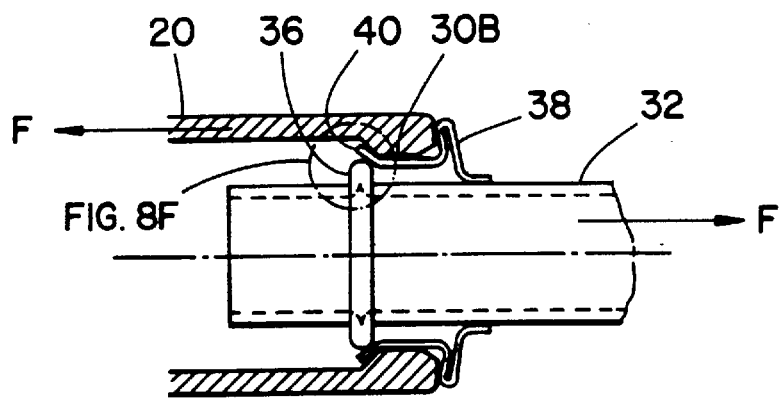
Figure 8F:
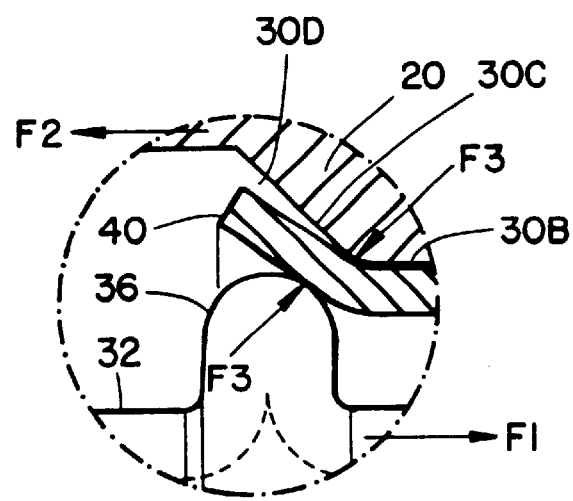

Referring to the drawings, FIG. 1 illustrates a female receptor (20) with a cavity (22) having an entrance or front end (26) to the cavity (22). The entrance (26) to the cavity (22) contains an inwardly extending annular projection or protrusion (28) positioned at a predetermined distance from the entrance (26) to the female receptor (20). In the preferred embodiment, an exterior, inwardly sloping section of the protrusion angles outwardly, forming a bevel (30A) at the entrance (26) to the cavity (22). A middle section of the protrusion (30B) is located interior to the bevel (30A) and an interior section (30C) of the protrusion (28) is located interior to the middle section (30B). Upon insertion of a retainer, a portion of the cavity (22) adjacent to the interior section (30C) of the protrusion provides relief space for expansion of the retainer. (This relief space (30D) is illustrated in FIG. 8F discussed below.) The interior section of the protrusion (30C) may be at any angle in relation to the middle section (30B) provided that the retainer has room to expand in the relief space (30D).

It should be expressly understood that in some embodiments, the protrusion (28) may comprise an exterior, inwardly sloping section or bevel (30A) which tapers to an interior section (30C) without a separate middle section.

A male insert (32) of a predetermined diameter having a front or connecting end (34) includes an outwardly extending upset which, in the preferred embodiment, is an annular bead or ring (36) positioned at a predetermined distance from the connecting end (34) of the male insert (32). It is preferred that the ring (36) be an integral part of the male insert (32). For example, the male insert (32) with the ring (36) may be made from material such as steel, brass, copper or plastic. However, as discussed with reference to FIGS. 13A and 13B, the male insert (32) may also be formed from rope or cable with the ring (36) attached to the male insert (32) by any means so long as the ring (36) is secured to the male insert (32). Furthermore, the ring or bead (36) could also be a separate part which is attached to a male insert through connection means known in the art.

A hollow retainer (38) of a shape similar in cross section to the male insert (32) is capable of surrounding the male insert (32) in a manner that allows the retainer (38) to be moved or slid along the male insert (32). As shown in the embodiment of the retainer (38) in FIGS. 2, 3 and 4A to 4C, the retainer (38) comprises a central body (39) with a plurality of retainer arms (40). The retainer arms (40) are finger-like extensions which extend substantially perpendicular from the central body (39). Preferably, the retainer arms (40) are integral to the central body (39) and the retainer (38) is formed by means including but not limited to stamping, moulding or casting. However, the retainer arms (40) may also be comprised of a different material than the central body (39) and connected to the central body (39).

The retainer arms (40) extend along a longitudinal axis of the male insert (32). The retainer arms (40) may be constructed of any suitable material with resilient properties which will allow sufficient flex of the retainer arms (40) to allow the retainer arms (40) to compress and then to return to their original position without permanent deformation after assembly of the retainer arms (40) into the female receptor (20). Examples of materials which may be utilized for the retainer include metal and plastic. In the preferred embodiment, the retainer is comprised of pre-hardened stainless steel. However, other types of steel retainers and plastic retainers may also be preferred in some embodiments.

The central body (39) of the retainer (38) is preferably, but not necessarily, constructed from a solid material opposite the retainer arms (38) such that debris is prevented from entering the female receptor (20) once the retainer (38) has been positioned to form the connection. For example, the central body (39) may comprise a generally flat, solid planar body from which the retainer arms (40) extend.

The specific shape of the retainer arms (40) will be determined by the force needed to insert the retainer (38) and the force needed to retain the male insert (32) in the female receptor (20). In an embodiment designed for insertion of the retainer (38) without the use of a tool, the preferred embodiment of the shape of the retainer arms (40) is a "t-shape" or "y-shape" which allows for less insertion force needed to put the retainer (38) in place while still allowing for a sufficient amount of retention force. However, the specific shape of the retainer (38) can be varied without affecting the function of the connection. For example, the retainer arms (40) may also be straight. In alternate embodiments, the retainer arms (40) can be alternate shapes including wedge shaped as long as abutment of the retainer arms (40), the protrusion (28) and the annular ring (36), as described below, occurs after assembly of the connection.

Figure 5:
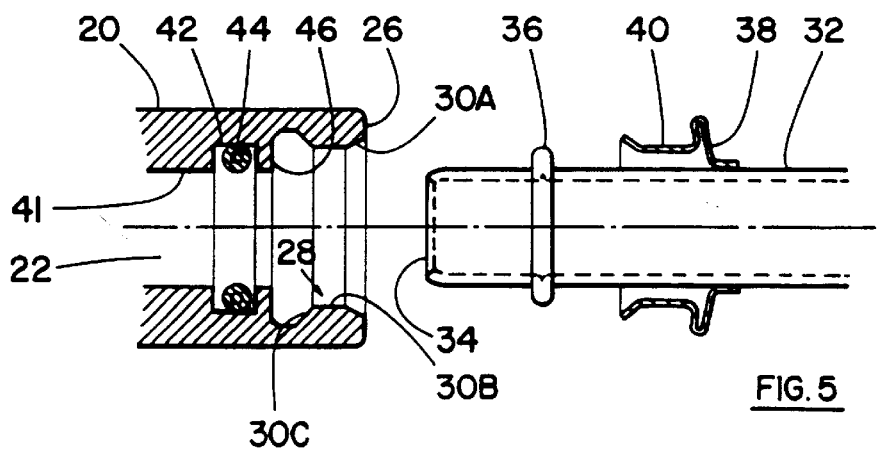
FIG. 5 is a sectional view of a second embodiment of the invention in a female-sealed design.
Figure 4B:
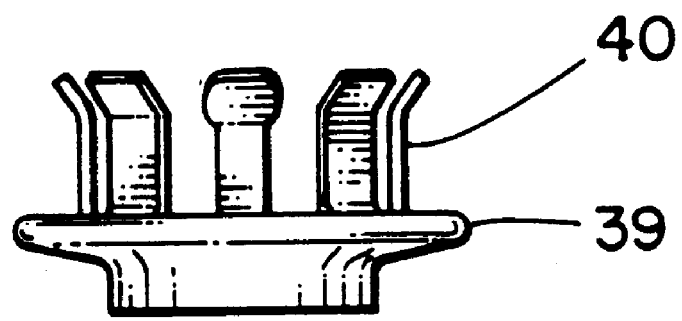
Figure 4C:
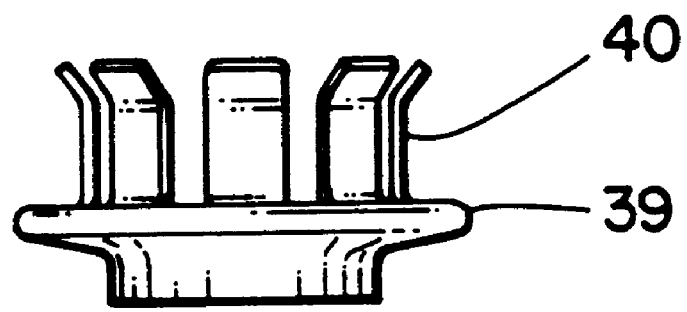

Referring to FIG. 5, in an alternate embodiment of the invention in a female-sealed design, the cavity (22) of the female receptor (20) comprises a reduced diameter portion (41) which is slightly larger in diameter than the diameter of the male insert (32). The cavity (22) also comprises a first recess (42) in which is placed sealing means such as o-rings (44). The reduced diameter portion (41) functions to centre the male insert (32) in the female receptor (20) when inserted, thereby limiting the load deflection of sealing means incorporated within the female receptor (20). Axial movement of the male insert (32) within the female receptor (20) can be limited by including a second reduced diameter portion or stop (46) a predetermined distance inside the female receptor (20) which permits the connection to resist axial movement both towards and away from the female receptor (20), or bi-directionally. The omission of the stop (46) will permit only unidirectional resistance in a direction away from the female receptor (20) to prevent the male insert (32) from being removed from the female receptor (20), but not movement of the male insert (32) into the female receptor (20).

Figure 6:
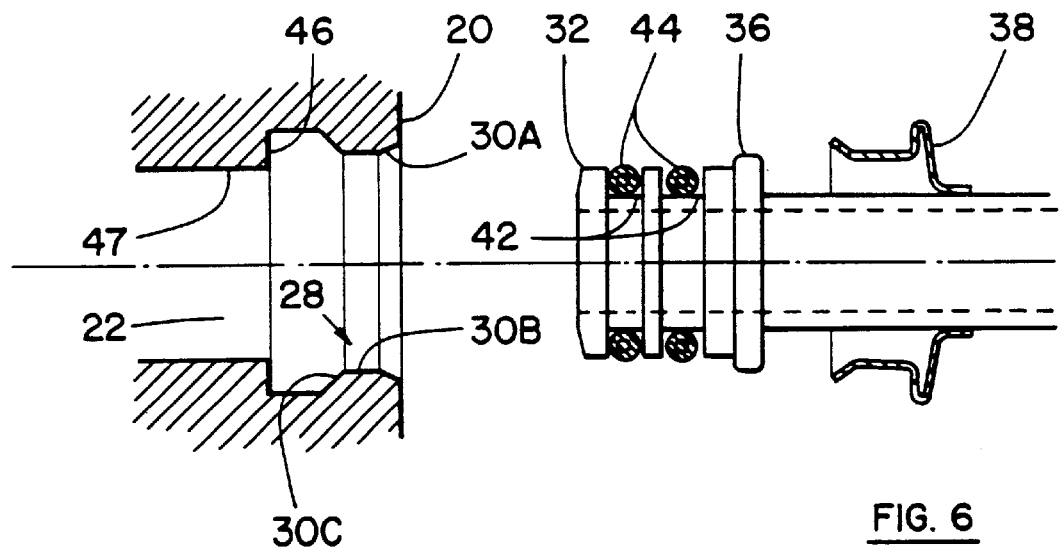
FIG. 6 is a sectional view of a third embodiment of the invention in a male-sealed design in unassembled position.
Figure 7:
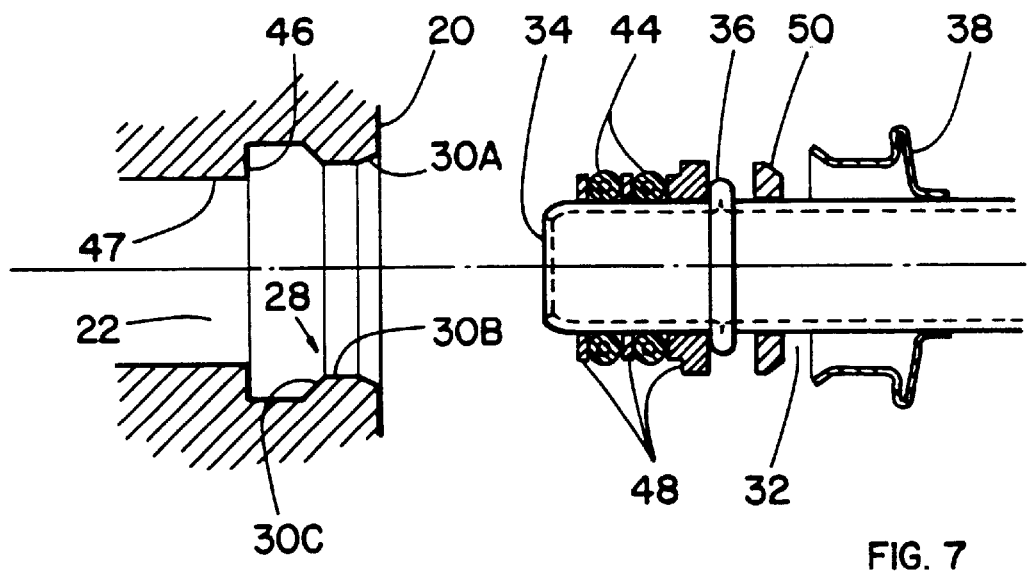
FIG. 7 is a sectional view of a fourth embodiment of a male receptor configuration in unassembled position.

In alternate embodiments of the invention shown in FIGS. 6 and 7, the male insert (32) contains, between the connecting end (34) of the male insert (32) and the ring (36), one or more inwardly extending second recesses (42). Sealing means such as an o-ring or a rings (44) are placed in the second recess (42). The female receptor (20) contains the protrusion (28) and stop (46). The cavity (22) of the female receptor (20) also includes a reduced diameter portion (47) which is slightly larger than the diameter of the male insert (32) which functions as an o-ring cavity in an embodiment containing an o-ring. An alternate embodiment of the invention as illustrated in FIG. 7 includes one or more seal spacers (48) between the o-rings (44) to maintain proper seal position and retain the o-rings (44) on the male insert (32). A second outwardly extending annular ring (50), positioned at a predetermined distance from the ring (36), may also be attached to the male insert (32).

While FIGS. 5–7, 10–12 and 14 illustrate various embodiments of the invention in sealed applications, it is expressly understood that the function of the connection is independent of the seal designs incorporated therein. For example, one or more o-rings may be incorporated but other sealing means such as, but not limited to, lip seals and gaskets may also be used, as known to one skilled in the art.

In the embodiments of the invention shown in the drawings, the annular protrusion (28) in the female receptor (20) is small enough to allow the ring (36) (or expanded end portion) to pass by the annular protrusion (28) into the cavity (22) during insertion of the male insert (32), yet large enough to retain the ring (36) (or expanded end portion) when combined with the thickness of the retainer arms (40) once the retainer (38) is moved into place, as described below.

In operation, and as illustrated in FIGS. 8A to 8F, the male insert (32) is inserted into the female receptor (20) such that the ring (36) passes the annular protrusion (28). The retainer (38) is positioned on the male insert (32) and is slid towards the female receptor (20). Force is then applied to the retainer (38) in the direction of the female receptor (20) wherein the retainer arms (40) are displaced around the middle section (30B) of the annular protrusion (28). Due to the resilient nature of the retainer arms (40), the retainer arms (40) expand when they reach the interior section of the protrusion (30C) into, as shown in FIG. 8F, the relief area (30D) created by the angle of the interior section of the protrusion (30C). During insertion of the retainer (38), the bevel (30A) in the female receptor (20) facilitates the insertion of the retainer (38) into the female receptor (20) without the use of tools.

During assembly, the assembler can determine that the connection has been made by hearing the retainer arms (40) pass into the relief area (30D). However, the assembler can also feel that the retainer (38) is in place in the event that assembly is taking place in an environment with minimal light since the central body (39) of the retainer (38) abuts the female receptor (20) at the entrance (26) to the cavity (22) when the retainer (38) is in place. (In the case of incomplete assembly, the assembler would be able to feel a gap between the female receptor (20) and the central body (39).) In brighter assembly environments, the assembler can also visually determine that the connection has been achieved given that the central body (39) of the retainer (38) remains exterior to the cavity (22) and abuts the entrance (26) to the cavity (22) upon assembly.

In the event that axial force is applied to attempt to remove the male insert (32) from the female receptor (20), the interference created between the ring (36), the annular protrusion (28) and the retainer arms (40) prevent the removal of the male insert (32). As illustrated in FIG. 8(F), in the event that force is applied to the male insert in the direction of the arrow F1, an opposing force F2 will be exerted by the female receptor (20). Force is therefore applied to the retainer arms in the direction illustrated by the arrows F3. A compressive load is therefore exerted on the retainer arms (40).

The retainer (38), when engaged, acts as a dust cap preventing debris from entering the female receptor (20) and affecting the operation of the retainer and any sealing means that may be incorporated into the female receptor (20) due to the abutment of the central body (39) of the retainer against the female receptor (20) at the entrance (26) to the cavity (22).

Figure 9A:
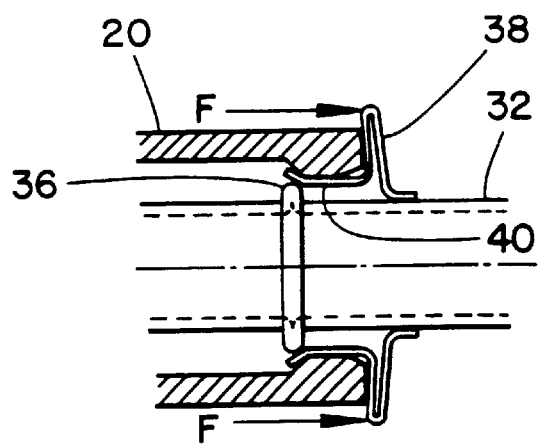
FIGS. 9A to 9C are sectional views illustrating the removal of the retainer in several embodiments of the invention.
Figure 9B:
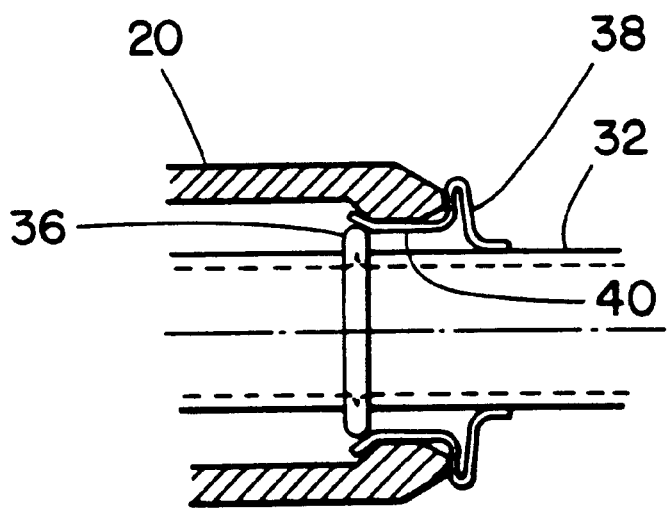
Figure 9C:
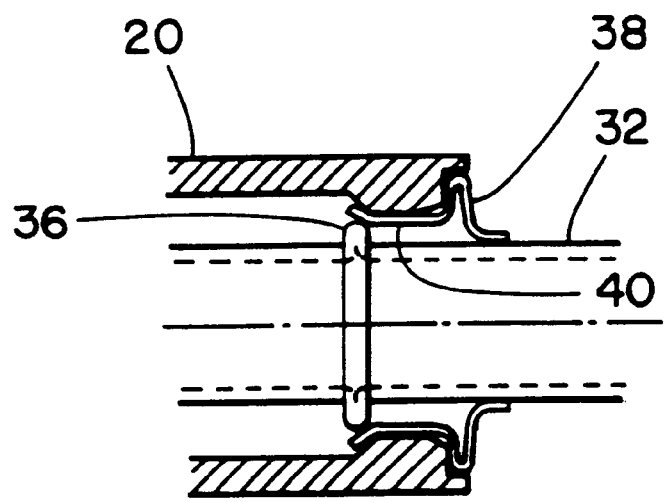

As illustrated in FIG. 9A, the retainer may be removed by prying or pulling the retainer (38) away from the female receptor (20) by hand without the use of a tool, thus allowing the male insert (32) to be withdrawn from the female receptor (20). (In the embodiment shown in FIG. 9A, the central body of the retainer is of a greater diameter than that of the entrance to the female receptor, thereby allowing for a person to grasp an outer part of the central body with his or her fingers to remove the retainer (38).) However, the ease of removal of the retainer (38) can be varied by the design of the retainer (38) and the female receptor (20), such as allowing the retainer (38) to only slightly protrude beyond the edges of the female receptor (20) for easy removal with a tool (FIG. 9B) or by mounting the retainer (38) in a recess at the entrance (26) to the cavity (22) to the female receptor (20) (as illustrated in FIG. 9C) to decrease ease of removal. The end use of the connection will determine how readily the assembly should be capable of disconnection, and therefore the arrangement of the retainer (38) and the female receptor (20) after connection.

Figure 10:
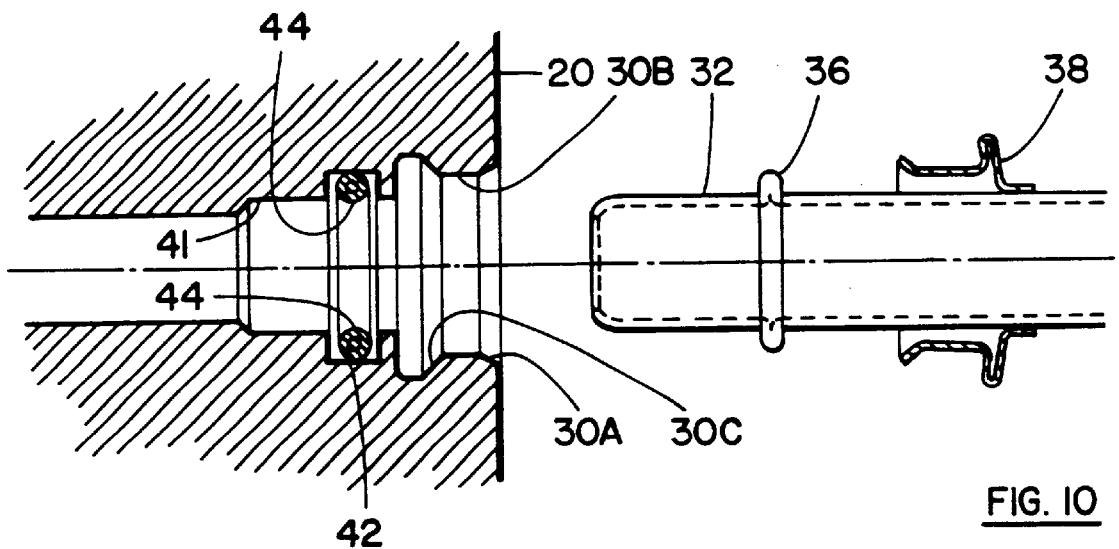
FIG. 10 is a sectional view of a fifth embodiment of the invention of a female-sealed integral receptor configuration in unassembled position.
Figure 11:
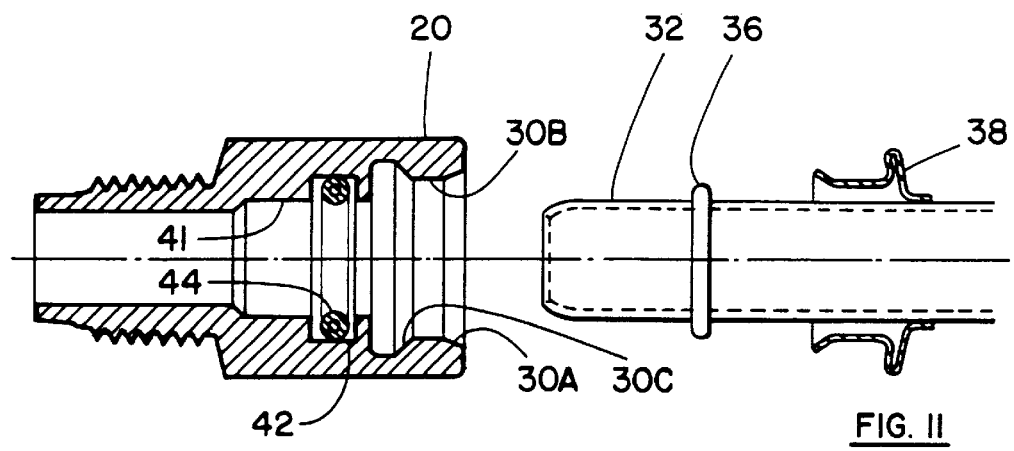
FIG. 11 is a sectional view of a sixth embodiment of the invention of a female-sealed receptor adapter fitting in unassembled position.

In alternate embodiments of the invention in FIGS. 10 and 11, a female-sealed receptor is illustrated. In FIG. 10, the female receptor (20) may be moulded, machined or cast in a housing to reduce the total cost of the connection. In FIG.

11, the female receptor (20) is inserted into an existing threaded hole which can replace quick connect fittings or threaded fittings from other connection or joint designs without any additional redesign work required to utilize the design.

Figure 12:
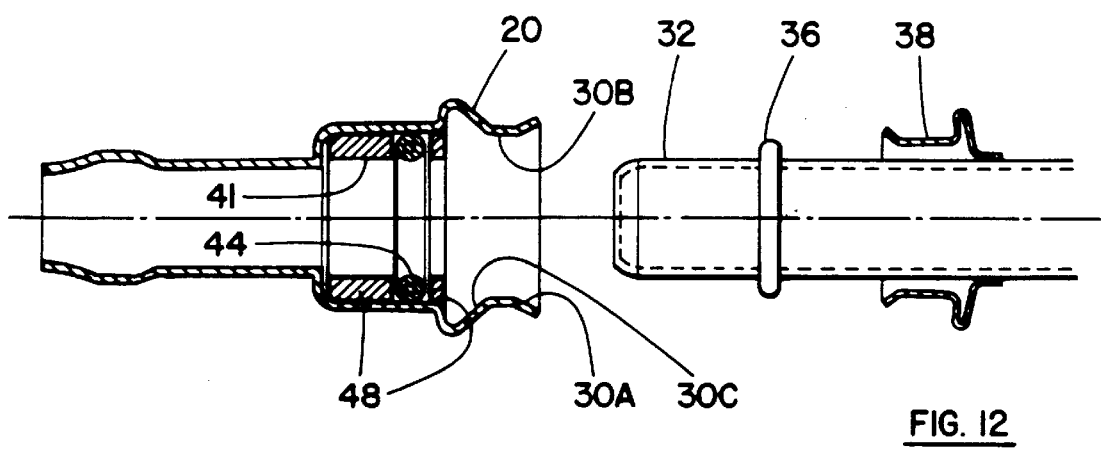
FIG. 12 is a sectional view of a seventh embodiment of the invention of a female-sealed receptor adapter for tubing or hosing with spacers press-fit into a stamped or moulded receptor in unassembled position.

In the alternate embodiment of the invention in FIG. 12, the female retainer (20) is sealed with an adapter to allow connection of tubing or hosing. Spacers (48) are included which are press-fit into a stamped or moulded female receptor (20).

FIG. 13A shows an alternate embodiment in an unsealed configuration. In this embodiment, the female receptor (20) is a plate. A hole in the plate extends inwardly to form a protrusion having an exterior, inwardly sloping section (30A), a middle section (30B) and an interior section (30C). The male insert (32) is a solid cable or shaft. A ring (36), bead or other upset is fixed to the male insert (32). The retainer (38) is then utilized as disclosed above to secure the connection. FIG. 13B illustrates an alternate embodiment of an unsealed configuration wherein a simple pierced hole in a plate (the plate having a predetermined plate thickness) functions as the female receptor (20). The resilient retainer arms (40) therefore are allowed to expand after they have passed through the plate. The length of the retainer arms (40) will therefore be chosen to be proportional to the thickness of the plate.

Figure 14A:
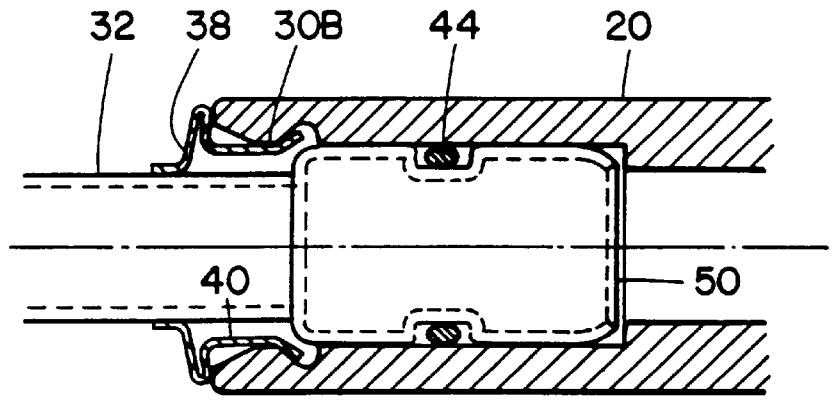
FIGS. 14A to 14F are alternate embodiments of the invention.
Figure 14B:
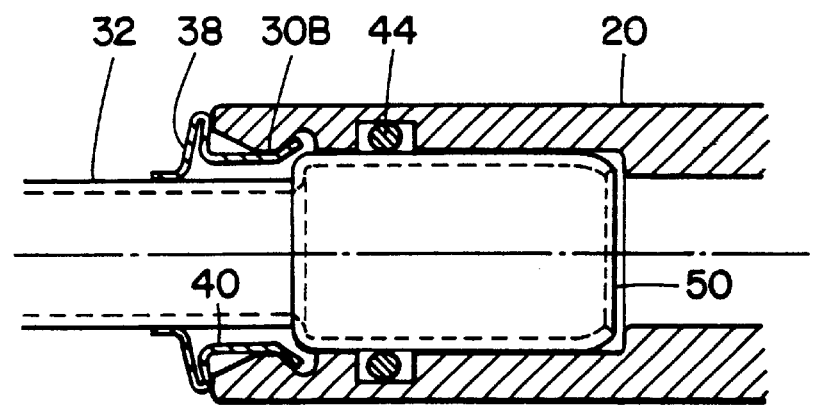
Figure 14C:
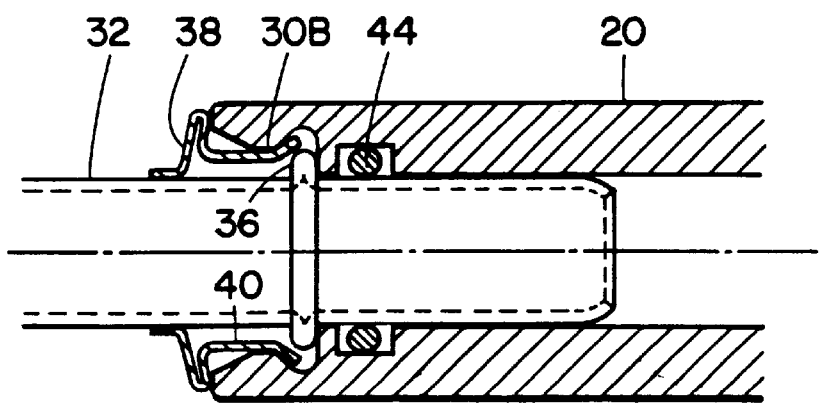
Figure 14D:
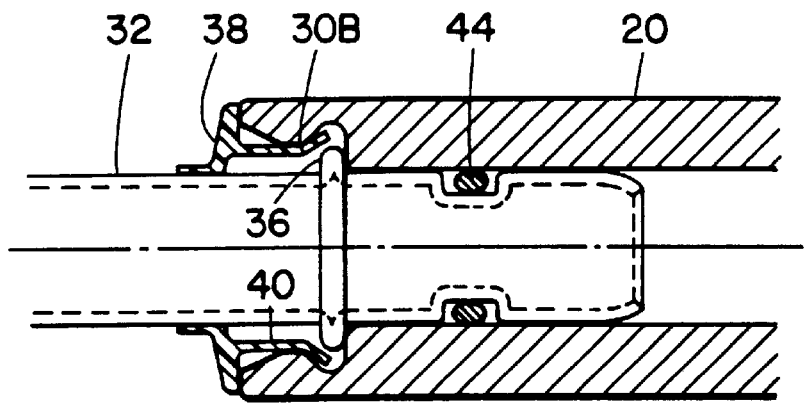
Figure 14E:
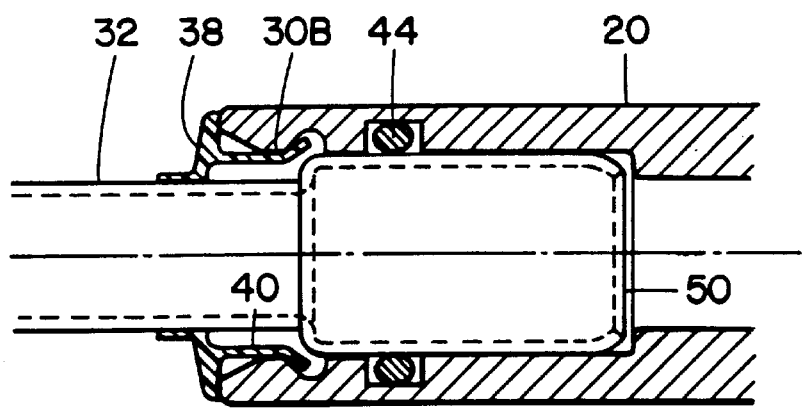
Figure 14F:
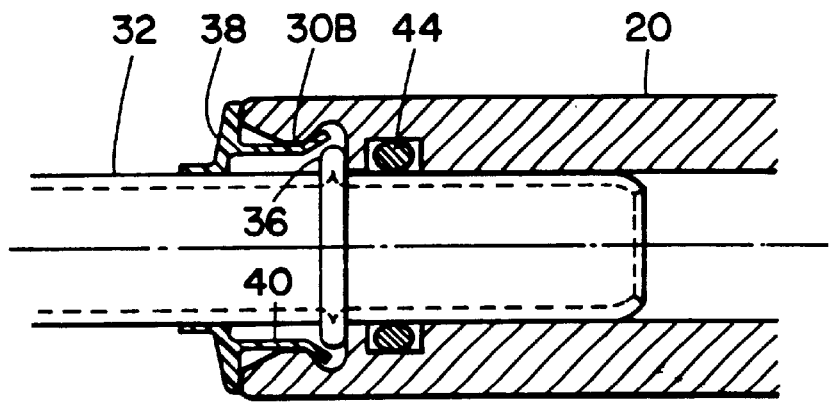

FIG. 14A shows an alternate embodiment of the male insert and annular ring whereby the male insert has an expanded end (50) which functions as a ring/bead equivalent in a male sealed design. The female receptor (20) also contains a protrusion. The female receptor (20) also contains a reduced diameter portion having a stop to prevent insertion of the male insert (32) past the stop. The retainer (38) retains the male insert (32) in the female receptor (20) through interference between the retainer arms (40), the protrusion (28) and the expanded end (50). FIG. 14B illustrates an alternate embodiment of a male insert with an expanded end portion in a female sealed design. FIGS. 14C to 14E are alternate embodiments of the invention with FIGS. 14D to 14E illustrating an embodiment with a plastic retainer.

Persons skilled in the art would recognize, or be able to ascertain using no more than routine experimentation, many equivalents to the embodiments of the present invention. Such equivalents are contemplated and intended to be encompassed within the spirit and scope of the inventions as defined in the following claims.

What is claimed is:

1. A connector assembly comprising:
   a male insert of substantially uniform diameter and having an integrally formed upset of increased diameter;
   a female receptor having a cavity for receiving the male insert, the cavity extending axially inwardly from a front end to an interior portion of the female receptor, the cavity having an inwardly extending protrusion, the protrusion comprising an interior section, a middle section and an exterior, inwardly sloping section, with the exterior section sloping inward from the front end to the middle section;
   a slideable retainer member surrounding the male insert, the retainer member comprising a plurality of elongate, resilient retainer arms, the arms adapted to be compressed between the upset and the protrusion, the arms extending along a longitudinal axis of the male insert, wherein a portion of the cavity inward of the protrusion allows for space for the retainer arms to expand after the retainer arms are deformed around the middle section of the protrusion upon insertion of the retainer member into the cavity, and
   wherein, when assembled, the male insert is retained within the female receptor through interference of the retainer arms between the upset and the protrusion.

2. The connector assembly of claim 1 wherein the retainer arms are substantially perpendicular to a central body of the retainer, the central body abutting the front end of the female receptor upon insertion of the male insert into the female receptor and insertion of the retainer member.

3. The connector assembly of claim 2 wherein the central body is generally solid, flat and planar, the central body abutting the front end of the female receptor upon insertion of the male insert into the female receptor and insertion of the retainer member.

4. The connector assembly of claim 2 wherein the retainer arms have a shape selected from the group consisting of a T-shape, a Y-shape and a straight shape.

5. The connector assembly of claim 1 wherein the cavity in the female receptor has a reduced diameter portion, said portion slightly greater in diameter than the diameter of the male insert, said portion centering the male insert in the cavity in the female receptor during insertion of the male insert into the female receptor.

6. The connector assembly of claim 5 wherein the cavity in the female receptor has a second reduced diameter portion a predetermined distance from and interior to the protrusion, the second reduced diameter portion having a diameter less than the diameter of the male insert at the upset.

7. The connector assembly of claim 2 wherein, upon assembly, the central body of the retainer member protrudes beyond the entrance to the cavity in the female receptor.

8. The connector assembly of claim 2 wherein the central body of the retainer has a larger diameter than a diameter of the female receptor.

9. A kit to join axially loaded components comprising:
   a male insert of substantially uniform diameter and having an integrally formed upset of increased diameter;
   a female receptor having a cavity for receiving the male insert, the cavity extending axially inwardly from a front end to an interior portion of the female receptor, the cavity having an inwardly extending protrusion, the protrusion comprising an interior section, a middle section and an exterior, inwardly sloping section, with the exterior section sloping inward from the front end to the middle section; and
   a retainer member capable of slideable adaptation around the male insert, the retainer member comprising a plurality of elongate, resilient retainer arms, the arms adapted to be compressed between the upset and the protrusion when the male insert and the female receptor are joined to create an interference fit between the male insert and the female receptor.

10. The kit of claim 9 wherein the retainer arms are substantially perpendicular to a central body of the retainer, the central body abutting the front end of the female receptor upon insertion of the male insert into the female receptor and insertion of the retainer member.

11. The kit of claim 10 wherein the central body is generally solid, flat and planar, the central body abutting the front end of the female receptor upon insertion of the male insert into the female receptor and insertion of the retainer member.

12. A kit to join axially loaded components comprising:
   a male insert of substantially uniform diameter and having an integrally formed upset of increased diameter;
   a female receptor having a cavity for receiving the male insert, the cavity extending axially inwardly from a front end to an interior portion of the female receptor, the cavity having an inwardly extending annular protrusion, the annular protrusion comprising an interior section, a middle section and an exterior, inwardly sloping section, with the exterior section sloping inward from the front end to the middle section; and a retainer member capable of slideable adaptation around the male insert, the retainer member comprising a plurality of elongate, resilient retainer arms, the arms adapted to be compressed between the upset and the annular protrusion when the male insert and the female receptor are joined to create an interference fit between the male insert and the female receptor, wherein a portion of the cavity inward of the annular protrusion allows for space for the retainer arms to expand after the retainer arms are deformed around the middle section of the annular protrusion upon insertion of the retainer member into the female receptor.

13. The kit of claim 12 wherein the retainer arms are substantially perpendicular to a central body of the retainer, the central body abutting the front end of the female receptor upon insertion of the male insert into the female receptor and insertion of the retainer member.

14. The kit of claim 13 wherein the central body is generally solid, flat and planar, the central body abutting the front end of the female receptor upon insertion of the male insert into the female receptor and insertion of the retainer member.

15. A connector assembly, comprising:

a male insert of substantially uniform diameter and having an integrally formed upset of increased diameter;

a female receptor having a cavity for receiving the male insert, the cavity extending axially inwardly from a front end to an interior portion of the female receptor, the cavity having an inwardly extending protrusion, the protrusion comprising an interior section, a middle section and an exterior, inwardly sloping section, with the exterior section sloping inward from the front end to the middle section; and a slideable retainer member surrounding the male insert, the retainer member comprising a plurality of elongate, resilient retainer arms, the retainer arms extending along a longitudinal axis of the male insert, the retainer arms adapted to be compressed between the upset and the protrusion to create an interference fit between the male insert and the female receptor and retain the male insert in the female receptor.

16. The connector assembly of claim 15 wherein the retainer arms are configured to expand upon insertion of the male insert into the female receptor and insertion of the retainer member.

17. The connector assembly of claim 15 wherein the retainer arms are substantially perpendicular to a central body of the retainer, the central body adapted to abut the front end of the female receptor upon insertion of the male insert into the female receptor and insertion of the retainer member.

18. The connector assembly of claim 17 wherein the central body is generally solid, flat and planar, the central body adapted to abut the front end of the female receptor upon insertion of the male insert into the female receptor and insertion of the retainer member.

19. A connector assembly, comprising:

a male insert of substantially uniform diameter and having an integrally formed upset of increased diameter;

a female receptor having a cavity for receiving the male insert, the cavity extending axially inwardly from a front end to an interior portion of the female receptor, the cavity having an inwardly extending annular protrusion, the protrusion comprising an interior section, a middle section and an exterior, inwardly sloping section, with the exterior section sloping inward from the front end to the middle section;

a slideable retainer member surrounding the male insert, the retainer member comprising a plurality of elongated, resilient retainer arms, the arms adapted to be compressed between the upset and the protrusion, the arms extending along a longitudinal axis of the male insert, wherein a portion of the cavity inward of the protrusion allows for space for a plurality of retainer arms to expand after the retainer arms are deformed around the middle section of the protrusion upon insertion of the retainer member into the female receptor, and wherein the cavity within the female receptor includes a radially defined first recess containing sealing means.

20. The connector assembly of claim 19 wherein the cavity of the female receptor has a reduced diameter portion, said portion slightly greater in diameter than a diameter in the male insert, said portion centering the male insert in the cavity of the female receptor during insertion of the male insert into the female receptor.

21. The connector assembly of claim 14 wherein the cavity in the female receptor has a second reduced diameter portion a predetermined distance from and interior to the protrusion.

22. The connector assembly of claim 1 further comprising a first recess defined within the cavity of the female receptor, the first recess containing sealing means.

23. The connector assembly of claim 22 wherein the first recess and sealing means are positioned in the cavity such that the sealing means is not compressed by the male insert upon insertion of the male insert into the female receptor.

24. A connector assembly comprising:

a male insert of substantially uniform diameter and having an integrally formed upset of increased diameter;

a female receptor having a cavity for receiving the male insert, the cavity extending axially inwardly from a front end to an interior portion of the female receptor, the cavity having an inwardly extending protrusion, the protrusion comprising an interior section, a middle section and an exterior, inwardly sloping section, with the exterior section sloping inward from the front end to the middle section;

a slideable retainer member surrounding the male insert, the retainer member comprising a plurality of elongate, resilient retainer arms, the arms adapted to be compressed between the upset and the protrusion, the arms extending along a longitudinal axis of the male insert, wherein a portion of the cavity inward of the protrusion allows for space for the retainer arms to expand after the retainer arms are deformed around the middle section of the protrusion upon insertion of the retainer member into the cavity, wherein, when assembled, the male insert is retained within the female receptor through interference of the retainer arms between the upset and the protrusion, wherein the retainer arms are substantially perpendicular to a central body of the retainer, the central body abutting the front end of the female receptor upon insertion of the male insert into the female receptor and insertion of the retainer, and wherein the female receptor further defines a retainer recess near the entrance to the cavity, the retainer recess adapted to receive the central body of the retainer upon assembly.

* * * * *

UNITED STATES PATENT AND TRADEMARK OFFICE
CERTIFICATE OF CORRECTION

PATENT NO. : 6,267,416 B1
DATED : July 31, 2001
INVENTOR(S) : Luis Ferreira et al.

It is certified that error appears in the above-identified patent and that said Letters Patent is hereby corrected as shown below:

Title page,
Item [75] Inventors, "D'Juric" should read -- Djuric --; and "Mississauga" should read -- Brampton --.

Column 4,
Line 53, "retainer arms (38)" should read -- retainer arms (40) --.

Column 5,
Line 32, "or a rings (44)" should read -- or o-rings (44) --.

Column 10,
Line 18, "female receptor" should read -- connector assembly --.
Line 21, "of the female" should read -- in the female --.
Line 23, "of claim 14" should read -- of claim 19 --.

Signed and Sealed this

Fourteenth Day of May, 2002

Attest:

JAMES E. ROGAN
Attesting Officer  *Director of the United States Patent and Trademark Office*